United States Patent
Satish

(10) Patent No.: US 7,856,090 B1
(45) Date of Patent: Dec. 21, 2010

(54) AUTOMATIC SPIM DETECTION

(75) Inventor: Sourabh Satish, Fremont, CA (US)

(73) Assignee: Symantec Corporation, Mountain View, CA (US)

( * ) Notice: Subject to any disclaimer, the term of this patent is extended or adjusted under 35 U.S.C. 154(b) by 1223 days.

(21) Appl. No.: 11/200,326

(22) Filed: Aug. 8, 2005

(51) Int. Cl.
H04M 11/00 (2006.01)
G06F 15/16 (2006.01)

(52) U.S. Cl. ............... 379/93.01; 709/206; 709/225

(58) Field of Classification Search ............ 379/93.01; 709/206, 225
See application file for complete search history.

(56) References Cited

U.S. PATENT DOCUMENTS

| | | | |
|---|---|---|---|
| 4,922,521 A * | 5/1990 | Krikke et al. ............ 379/93.02 |
| 5,465,387 A * | 11/1995 | Mukherjee ............... 455/26.1 |
| 6,167,434 A | 12/2000 | Pang |
| 6,249,807 B1 | 6/2001 | Shaw et al. |
| 6,282,565 B1 | 8/2001 | Shaw et al. |
| 6,289,416 B1 | 9/2001 | Fukushima et al. |
| 6,324,569 B1 | 11/2001 | Ogilvie et al. |
| 6,487,586 B2 | 11/2002 | Ogilvie et al. |
| 6,493,007 B1 | 12/2002 | Pang |
| 6,546,416 B1 | 4/2003 | Kirsch |
| 6,640,301 B1 | 10/2003 | Ng |
| 6,643,685 B1 | 11/2003 | Millard |
| 6,650,890 B1 | 11/2003 | Irlam et al. |
| 6,654,787 B1 | 11/2003 | Aronson et al. |
| 6,687,740 B1 | 2/2004 | Gough |
| 6,691,156 B1 | 2/2004 | Drummond et al. |
| 6,697,942 B1 | 2/2004 | L'Heureux |
| 6,701,347 B1 | 3/2004 | Ogilvie |
| 6,711,608 B1 | 3/2004 | Ogilvie |
| 6,732,157 B1 | 5/2004 | Gordon et al. |
| 6,757,713 B1 | 6/2004 | Ogilvie et al. |
| 6,757,830 B1 | 6/2004 | Tarbotton et al. |
| 7,035,386 B1 * | 4/2006 | Susen et al. ............. 379/93.02 |
| 7,577,993 B2 * | 8/2009 | Roychowdhary et al. ...... 726/22 |
| 7,600,258 B2 * | 10/2009 | Desouza et al. ............ 726/24 |
| 7,711,781 B2 * | 5/2010 | Davis et al. ............... 709/206 |
| 2002/0087641 A1 | 7/2002 | Levosky |

(Continued)

OTHER PUBLICATIONS

CAUCE.org web pages [online] Coalition Against Unsolicited Commercial Email [retrieved Mar. 17, 2003] Retrieved from the Internet: <URL: http://www.cauce.org/about/problem.shtml> U.S.A.

(Continued)

*Primary Examiner*—Joseph T Phan
(74) *Attorney, Agent, or Firm*—Fenwick & West LLP

(57) ABSTRACT

A spim detection manager automatically detects and blocks spim. The spim detection manager detects a first incoming instant message from an unrecognized source, and sends a response to that source. The spim detection manager receives a second incoming instant message from the unrecognized source in reply to the sent response. The spim detection manager examines the second incoming instant message, and determines whether the incoming instant messages comprise spim based on its content. In some embodiments, the spim detection manager concludes that at least one of the incoming instant messages was generated by an automated process, and that therefore the incoming messages comprise spim. Where the spim detection manager determines that an incoming instant message comprises spim, it blocks that incoming message. Where the spim detection manager determines that an incoming instant message is legitimate, it forwards that message to the target user.

18 Claims, 3 Drawing Sheets

U.S. PATENT DOCUMENTS

| | | | |
|---|---|---|---|
| 2002/0138581 | A1 | 9/2002 | MacIntosh et al. |
| 2003/0149726 | A1 | 8/2003 | Spear |
| 2003/0167311 | A1 | 9/2003 | Kirsch |
| 2003/0191969 | A1 | 10/2003 | Katsikas |
| 2003/0200334 | A1 | 10/2003 | Grynberg |
| 2003/0220978 | A1 | 11/2003 | Rhodes |
| 2003/0229672 | A1 | 12/2003 | Kohn |
| 2003/0233415 | A1 | 12/2003 | Beyda |
| 2004/0003283 | A1 | 1/2004 | Goodman et al. |
| 2004/0024823 | A1 | 2/2004 | Del Monte |
| 2004/0054887 | A1 | 3/2004 | Paulsen et al. |
| 2004/0064734 | A1 | 4/2004 | Ehrlich |
| 2004/0068534 | A1 | 4/2004 | Angermayr et al. |
| 2004/0073617 | A1 | 4/2004 | Milliken et al. |
| 2004/0093383 | A1 | 5/2004 | Huang et al. |
| 2004/0093384 | A1 | 5/2004 | Shipp |
| 2004/0111480 | A1 | 6/2004 | Yue |
| 2004/0148358 | A1 | 7/2004 | Singh et al. |
| 2004/0205173 | A1 | 10/2004 | Hall |
| 2005/0055416 | A1* | 3/2005 | Heikes et al. ............... 709/207 |
| 2005/0198160 | A1* | 9/2005 | Shannon et al. ............ 709/206 |
| 2006/0101021 | A1* | 5/2006 | Davis et al. ..................... 707/9 |
| 2006/0168009 | A1* | 7/2006 | Lyle et al. ................... 709/206 |
| 2006/0168048 | A1* | 7/2006 | Lyle et al. ................... 709/206 |
| 2006/0187900 | A1* | 8/2006 | Akbar ........................ 370/352 |
| 2007/0006026 | A1* | 1/2007 | Roychowdhary et al. ...... 714/12 |
| 2007/0016641 | A1* | 1/2007 | Broomhall .................. 709/206 |
| 2007/0039040 | A1* | 2/2007 | McRae et al. .................. 726/4 |
| 2007/0088793 | A1* | 4/2007 | Landsman .................. 709/207 |
| 2007/0150276 | A1* | 6/2007 | Srivastava et al. ........... 704/246 |

OTHER PUBLICATIONS

Outlook.spambully.com web pages [online] Spam Bully [retrieved Jan. 16, 2003] Copyright 2002, Retrieved from the Internet <URL: http://outlook.spambully.com/about.php>.

NBEC/NWOCA Anti-Spam Tools, [online] [retrieved Jul. 7, 2004] retrieved from http://home.nwoca.org, Ohio, U.S.A., Jul. 7, 2004.

Kularski, C. "Compound Procedures for Spam Control," Highland School of Technology, Gastonia, NC, U.S.A., Jan. 2004.

"Technical Responses to Spam," Nov. 2003, Taughannock Networks, Trumansburg, New York, U.S.A.

Cranor, Faith, L., LaMacchia, Brian A., "Spam!" Communications of the ACM, vol. 41, No. 8, pp. 74-83, Aug. 1998. U.S.A.

How it Works:Spam Recognition, http://www.death2spam.net/docs/classifier.html, retrieved Aug. 18, 2005, U.S.A.

Cavnar, William B. et al., "N-Gram-Based Text Categorization", Proceedings of SDAIR-94, 3rd Annual Symposium on Document Analysis and Information Retrieval, Las Vegas, NV., USA, Apr. 13, 1994.

"N-Gram-Based Text Categorization", 2 pages, downloaded from http://citeseer.ist.psu.edu/68861.html, Aug. 25, 2005 U.S.A.

TextCat Language Guesser, 2 pages, downloaded from http:/odur.let.rug.nl/~vannoord/Textcat/ on Aug. 25, 2005., U.S.A.

Spam Assassin, The Apache SpamAssasin Project, 2 pages, downloaded from http:/spamassasin.apache.org on Aug. 25, 2005, U.S.A.

Basis Technology's Rosette Language Identifier, 2 pages, downloaded from http:/www.basistech.com/language-identification/ on Aug. 25, 2005, U.S.A.

Karp-Rabin algorithm, 3 pages, downloaded from http:/www-igm.univ-mlv.fr/~lecroq/string/node5.html on Sep. 1, 2005, U.S.A.

Rabin-Karp string search algorithm, 5 pages, downloaded from http://en.wikipedia.org/wiki/Rabin-Karp_string_search_alogrithm on Aug. 31, 2005 U.S.A.

The Rabin-Karp algorithm, String searching via Hashing, 5 pages, downloaded from http://www.eecs.harvard.edu/~ellard/Q-97/HTML/root/node43 on Aug. 31, 2005 U.S.A.

* cited by examiner

AUTOMATIC SPIM DETECTION

TECHNICAL FIELD

This invention pertains generally to computer security, and more specifically to automatically detecting and blocking spim.

BACKGROUND

Instant Messaging (IM) is becoming a popular form of electronic communication for both personal and business use. IM does not yet have as many users, especially business users, as e-mail. However, the number of business IM users is expected to grow rapidly; from 10 million in 2002 to 182 million in 2007, according to Ferris Research. As IM use increases, unsolicited, unwanted instant messages (known as spim) are becoming a growing concern, just as spam increased as e-mail became more popular. In 2003, spim amounted to approximately 400 million messages, according to the marketing-research firm the Radicati Group. For 2004, Radicati expects the number to triple to 1.2 billion. Compared to spam, this number is still relatively low; the projected number of spam e-mail messages for 2004 is 34.8 billion. However, spim is more obtrusive than spam, because messages pop up automatically on a computer, handheld computing device or mobile phone when a user is logged in, making them harder to ignore. Whereas the timing of spam e-mail is controlled by the recipient, the timing of spim is controller by the sender.

What is needed are computer implemented methods, computer readable media and computer systems for detecting and blocking spim.

DISCLOSURE OF INVENTION

Computer-implemented methods, computer systems and computer-readable media automatically detect and block spim. In one embodiment, a spim detection manager detects a first incoming instant message from an unrecognized source, and sends a response to that source. The spim detection manager receives a second incoming instant message from the unrecognized source in reply to the sent response. The spim detection manager examines the second incoming instant message, and determines whether the incoming instant messages comprise spim based on the content thereof. In some embodiments, the spim detection manager concludes that at least one of the incoming instant messages was generated by an automated process, and that therefore the incoming messages comprise spim.

Where the spim detection manager determines that an incoming instant message comprises spim, it blocks that incoming message. Where the spim detection manager determines that an incoming instant message does not comprise spim, it forwards that message to the target user.

The features and advantages described in this disclosure and in the following detailed description are not all-inclusive, and particularly, many additional features and advantages will be apparent to one of ordinary skill in the relevant art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

The Figures depict embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Figure 1:
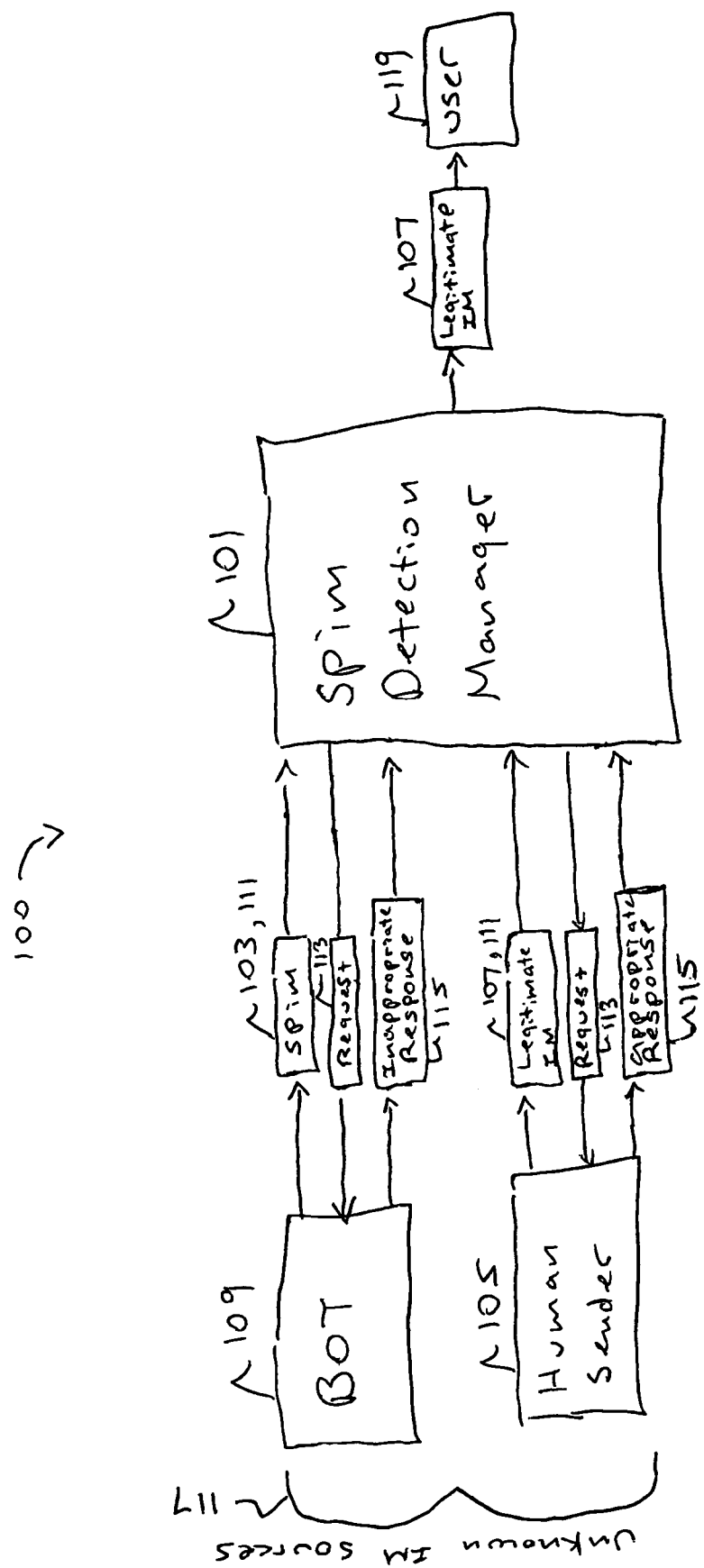
FIG. 1 is a block diagram, illustrating a high level overview of a system for detecting spim, according to some embodiments of the present invention.

FIG. 1 illustrates a high level overview of a system 100 for practicing some embodiments of the present invention. A spim detection manager 101 detects and blocks spim 103. It is to be understood that although the spim detection manager 101 is illustrated as a single entity, as the term is used herein a spim detection manager 101 refers to a collection of functionalities which can be implemented as software, hardware, firmware or any combination of these. Where a spim detection manager 101 is implemented as software, it can be implemented as a standalone program, but can also be implemented in other ways, for example as part of a larger program, as a plurality of separate programs, as one or more device drivers or as one or more statically or dynamically linked libraries.

In one embodiment of the present invention, the spim detection manager 101 is instantiated as a software component in the form of a plug-in. It is to be further understood that the spim detection manager 101 can also be implemented as or as a component of a software security suite, web browser and/or any application that attempts to detect spim 103. Furthermore, the spim detection manager 101 can be instantiated on and/or as part of a server, client, firewall, intrusion detection system, proxy, gateway, switch and/or any combination of these and/or other computing devices and/or platforms.

As illustrated in FIG. 1, in some embodiments of the present invention, the spim detection manager 101 attempts to distinguish a human sender 105 of legitimate instant messages 107 from an automated sender 109 of spim 103, known as a BOT. It is understood by those of ordinary skill in the relevant art that spim 103 is typically sent automatically by BOTS 109, which are typically implemented as software.

Because it is very difficult for a BOT 109 to simulate certain uniquely human behaviors, the spim detection manager 101 can detect spim 103 by interacting with the sender 117 of a suspicious instant message 111, and prompting for a return message 115 that would be easy for a human sender 105 to compose, but difficult for a BOT 109 to generate.

More specifically, the spim detection manager 101 can send a request 113 for a response 115 to all suspicious instant messages 111 (e.g., all messages originating from unrecognized sources 117). A BOT 109 will not send an appropriate response 115, but instead will automatically send a message that it is programmed to send (i.e., a spim message 103), or possibly will not respond at all.

For example, suppose the spim detection manager 101 receives an instant message 111 asking "Hello. Are you there?" from an unrecognized source 117. The spim detection manager 101 can generate an automated request 113 for a response 115 to determine whether the sender 117 is a BOT 109 without passing the incoming message 111 to the target user 119. The spim detection manager 101 will send a request 113 that would be easy for a human sender 105 o comply with, but could not be met by a BOT 109 that is not specifically programmed to respond to that specific request 113. For example, the request 113 could state "Please send me an instant message in red text that includes all of the blue colored words you see in this message, so that I can continue the conversation with you," wherein some of the words in the request 113 are in blue text. The request 113 can also be in the form of a question, such as "Joe and Bob are brothers. Who are Bob and Joe?" to which the expected answers 115 could be "brothers, men or people." Even an unsophisticated person 105 could easily answer such a question, but a spim BOT 109 would typically not be programmed to do so. Which request messages 113 to send to determine whether incoming messages 111 originate from a BOT 109, and what responses 115 to accept, are variable design parameters. Of course such requests 113 can also include text such as "I do not recognize who you are, so please answer this question so that I can continue the conversation with you," or words to that effect.

After requesting a reply 115, the spim detection manager 101 waits for a reply 115 from the instant message sender 117, and if it receives one, determines whether it is an appropriate response 115. If an appropriate response 115 is received, the spim detection manager 101 concludes that the original incoming message 111 is legitimate 107, and acts accordingly (e.g., forwards it to the user 119). On the other hand, if an inappropriate reply 115 is received (or no reply 115 at all) the spim detection manager 101 concludes that the incoming messages 111 was sent by a BOT 109, and is thus spim 103. In some embodiments of the present invention, the spim detection manager 101 executes additional steps to confirm that the incoming message 111 comprises spim 103, as discussed in greater detail below in conjunction with FIG. 3.

In some embodiments, when determining whether a response 115 is appropriate, the spim detection manager 101 takes into account common human typing mistakes, spelling errors and the like. For example, if the word "four" is expected in a response 115, a human might misspell the word as "for," type the numeral "4" or accidentally press an adjacent key on the keyboard, resulting in dour (d is left to f on keyboard), gour (g is right to f on keyboard), Your (v is below f on keyboard), cour (c is below f on keyboard), eour (e is above f on keyboard), etc. The specific mistake tolerance level to utilize is a variable design parameter, which can be adjusted up or down as desired.

In some embodiments, the requests 113 for replies 115 that the spim detection manager 101 sends to unknown instant messages senders 117 are changed from time to time, in order to prevent BOTS 109 from being programmed to generate the correct responses 115 to specific requests 113, and thus simulate human instant message senders 105. How often to vary the requests 113 is a design parameter. As will be apparent to those of ordinary skill in the relevant art in light of this specification, there are a virtually unlimited number of possible requests 113 that the spim detection manager 101 can send to unknown instant messages senders 117. A few additional examples include "What is the opposite of short?" (expected answers: tall, long) and "What is the shape of earth?" (expected answers: circular, spherical, circle, sphere, ball).

Figure 2:
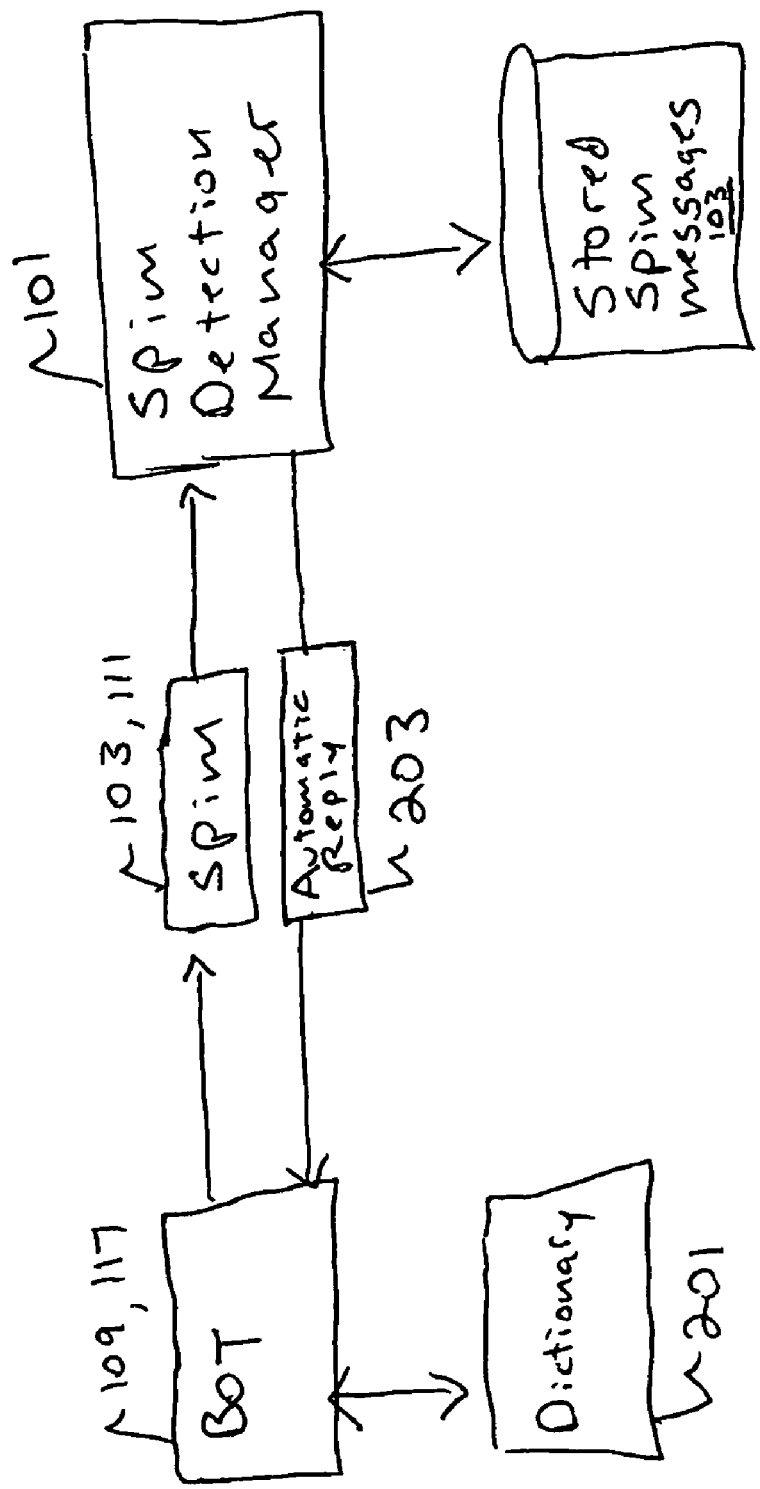
FIG. 2 is a block diagram illustrating an embodiment of the present invention in which spim that was automatically generated by a BOT using a dictionary is detected.

Turning now to FIG. 2, a BOT 109 is likely to use a dictionary 201 (e.g., a sentence or a word dictionary 201) to assemble its spim messages 103. Thus, the BOT 109 will typically send spim messages 103 from a finite set. In one embodiment, the spim detection manager 101 attempts to capture as many of these messages 103 as possible, and stores them for future spim 103 detection. Thus, when the spim detection manager 101 receives a suspicious incoming instant message 111, it sends an automatic reply 203 and continues to send automatic replies 203 for as long as the sender 117 (presumed to be a BOT 109) keeps sending incoming messages 111 (presumed to be spim 103). The spim detection manager 101 stores the incoming messages 111 received from the suspicious sender 117. Thus, over time, the spim detection manager 101 will receive and store more and more spim messages 103 automatically generated by the BOT 109, such that the spim detection manager 101 captures a substantial percentage (if not all) of the spim messages 103 that the BOT 109 can generate. The spim manager can subsequently compare suspicious incoming instant messages 111 to the stored spim messages 103, and determine with a higher degree of certainty whether or not an incoming instant message 111 comprises spim 103.

Figure 3:
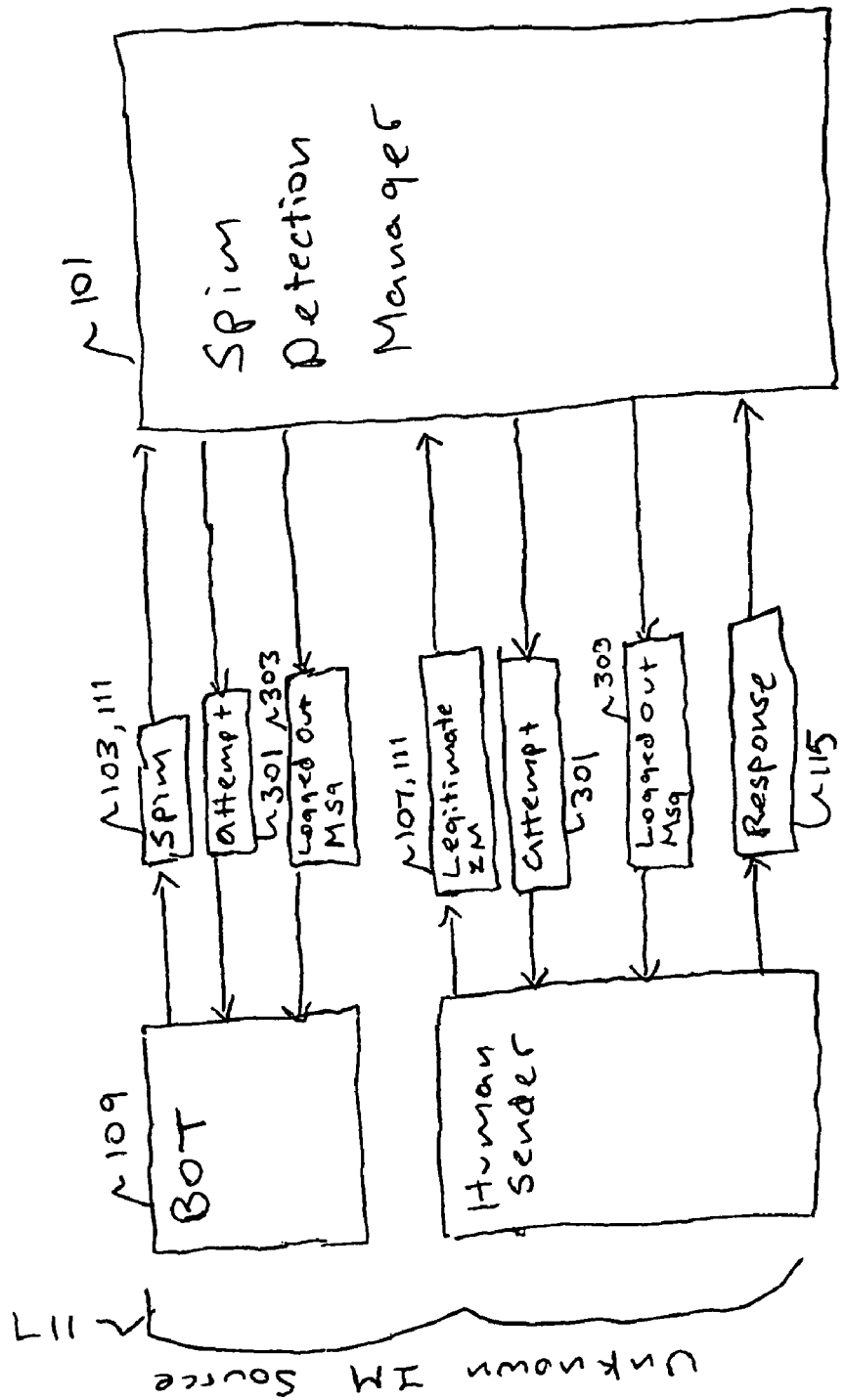
FIG. 3 is a block diagram illustrating the execution of additional steps to confirm that a suspicious instant message comprises spim, according to some embodiments of the present invention.

Turning now to FIG. 3, in some embodiments of the present invention, the spim detection manager 101 can perform additional steps to confirm that a suspicious instant message 111 comprises spim 103. For example, upon identifying a suspect instant message 111 (for example identifying a message sent by a BOT 109 according to one of the embodiments described above), the spim detection manager 101 can confirm that the sender 117 comprises a BOT 109 by waiting for a set period of time (e.g., ten minutes, fifteen minutes, etc.) and then sending an instant message 301 that attempts to initiate a conversation with the suspect sender 117. A BOT 109 typically does not be listen on a port, but instead simply sends out spim messages 103 to target users 119 (and possibly checks for real time replies). Thus, a BOT 109 will be expected to still be online but not to respond to an attempt 301 to initiate a conversation after the set time period has passed. So, in this embodiment, if the suspect sender 117 transmits a response 115, the spim detection manager 101 concludes that it is a legitimate human sender 105, whereas if the sender 117 does not reply, the spim detection manager 101 concludes that the original incoming message(s) 111 comprise(s) spim 103. In some embodiments, if no reply 115 is received the spim detection manager 101 again waits for a set period of time and again sends another request 301 for a conversation (this process can be repeated as desired to obtain a higher confidence level). Of course, the length of time for which to wait and the number of times to repeat the cycle (if any) are variable design parameters.

In another embodiment, responsive to receiving a suspect instant message 111, the spim detection manager 101 logs off the user 119 (or simulates the user 119 logging off) This sends a "LoggedOut" message 303 to the suspect sender 117, and terminates the chat session. Then, the spim detection manager 101 logs the user 119 back on and attempts to initiate communication by sending a message 301 with content such as "Oops I got disconnected. What's up?" Since BOTs 109 are typically not programmed to respond to requests 301 to chat initiated by other parties, if no response 115 is received the spim detection manager 101 concludes that the original incoming message(s) 111 comprise(s) spim 103. On the other hand, if a response 115 is received, the spim detection manager 101 concludes that the sender 117 is legitimate 105.

It is to be understood that when the spim detection manager 101 determines that an incoming instant message 111 comprises spim 103, it will typically not pass that message 103 to the user 119, but instead block the spim message 103. Additional actions are also possible responsive to detecting spim 103, such as blocking all future messages from that source 117, storing the message 103 for comparison to future suspicious messages 111 to determine whether those messages 111 comprise spim 103, and sharing information concerning the spim message 103 and or its source 117 remotely, such as with a security server or a centralized database. Responsive to determining that an incoming message 111 is legitimate 107, the spim detection manager 101 will typically forward that message 107 on to the user 119.

As will be understood by those familiar with the art, the invention may be embodied in other specific forms without departing from the spirit or essential characteristics thereof. Likewise, the particular naming and division of the modules, managers, functions, layers, features, attributes, methodologies and other aspects are not mandatory or significant, and the mechanisms that implement the invention or its features may have different names, divisions and/or formats. Furthermore, as will be apparent to one of ordinary skill in the relevant art, the modules, managers, functions, layers, features, attributes, methodologies and other aspects of the invention can be implemented as software, hardware, firmware or any combination of the three. Of course, wherever a component of the present invention is implemented as software, the component can be implemented as a script, as a standalone program, as part of a larger program, as a plurality of separate scripts and/or programs, as a statically or dynamically linked library, as a kernel loadable module, as a device driver, and/or in every and any other way known now or in the future to those of skill in the art of computer programming. Additionally, the present invention is in no way limited to implementation in any specific programming language, or for any specific operating system or environment. Accordingly, the disclosure of the present invention is intended to be illustrative, but not limiting, of the scope of the invention, which is set forth in the following claims.

What is claimed is:

1. A computer implemented method for automatically detecting spim, the method comprising:
   detecting an incoming instant message directed to a user from an unrecognized source;
   logging the user out of a chat session to send a message to a sender of the incoming instant message indicating that the user is logged out;
   logging the user into the chat session after the message indicating that the user is logged out is sent;
   responsive to logging the user into the chat session, attempting to initiate an electronic conversation with the sender of the incoming instant message by sending a question to the sender; and
      responsive to not receiving an appropriate reply to the attempt to initiate the electronic conversation concluding that the incoming instant message comprises spim.

2. The method of claim 1 further comprising:
   determining that the incoming instant message comprises spim based on not receiving a reply to the attempt to initiate the electronic conversation.

3. The method of claim 1 further comprising:
   receiving a second incoming instant message from the unrecognized source, the second incoming message being received as a reply to the attempt to initiate the electronic conversation;
   examining the second incoming instant message; and
   determining whether the incoming instant message comprises spim based on at least results of examining the second incoming instant message.

4. The method of claim 3 further comprising:
   concluding that the second incoming instant message was generated by an automated process; and
   responsive to concluding that the second incoming instant message was generated by an automated process, determining that the incoming instant message comprises spim.

5. The method of claim 1 further comprising:
   receiving a reply to the attempt to initiate the electronic conversation;
   concluding that the incoming instant message and the reply comprise spim;
   storing the incoming instant message and reply as identified spim;
   sending a response to the reply, and sending responses to additional received replies; and
   storing the additional received replies as identified spim.

6. The method of claim 5 further comprising:
   receiving an incoming message suspected to comprise spim;
   determining that the incoming message suspected to comprise spim is sufficiently similar to stored identified spim; and
   determining that the incoming message suspected to comprise spim comprises spim responsive to the determination of sufficient similarity.

7. The method of claim 1 further comprising:
   determining whether the incoming instant message comprises spim based at least in part on whether a reply to the sent question comprises an appropriate answer to the question.

8. The method of claim 7 further comprising:
   concluding that the incoming instant message comprises spim responsive to the reply to the sent question not comprising an appropriate answer to the question.

9. The method of claim 7 wherein determining whether the reply to the sent question comprises an appropriate answer to the question further comprises:
   comparing the reply to the sent question to at least one appropriate answer to the question.

10. The method of claim 9 wherein comparing the reply to the sent question to at least one appropriate answer to the question further comprises:
    taking into account common spelling and/or typographical errors.

11. The method of claim 7 further comprising:
    periodically updating the question to be sent to incoming instant messages from unrecognized sources.

12. The method of claim 1 further comprising:
    blocking the incoming instant message responsive to a conclusion that the incoming instant message comprises spim.

13. The method of claim 1 further comprising:
    forwarding the incoming instant message to the user responsive to a conclusion that the incoming instant message does not comprise spim.

14. A computer readable storage medium containing executable computer program code for automatically detecting spim, the computer program code comprising:
    program code for detecting an incoming instant message directed to a user from an unrecognized source;
    program code for logging the user out of a chat session to send a message to the sender of the incoming instant message indicating that the user is logged out;
    program code for logging the user into the chat session after the message indicating that the user is logged out is sent;

program code for attempting to initiate an electronic conversation with the sender of the incoming instant message by sending a question to the sender responsive to logging the user into the chat session; and program code for determining whether the incoming instant message comprises spim based on whether an appropriate reply to the attempt to initiate the electronic conversation is received.

15. The computer readable medium of claim 14 further comprising:

program code for receiving a second incoming instant message from the unrecognized source, the second incoming instant message being received as a reply to the attempt to initiate the electronic conversation;

program code for examining the second incoming instant message; and program code for determining whether the incoming instant message comprises spim based on at least results of examining the second incoming instant message.

16. The computer readable medium of claim 15 further comprising:

program code for concluding that the second incoming instant message was generated by an automated process; and program code for, responsive to concluding that the second incoming instant message was generated by an automated process, determining that the incoming instant message comprises spim.

17. A computer system for automatically detecting spim, the computer system comprising:

a computer-readable storage medium comprising:

a software portion configured to detect an incoming instant message directed to a user from an unrecognized source;

a software portion configured to log the user out of a chat session to send a message to the sender of the incoming instant message indicating that the user is logged out;

a software portion configured to log the user into the chat session after the message indicating that the user is logged out is sent;

a software portion configured to attempt to initiate an electronic conversation with the sender of the incoming instant message by sending a question to the sender responsive to logging the user into the chat session; and a software portion configured to, responsive to not receiving an appropriate reply to the attempt to initiate the electronic conversation, conclude that the incoming instant message comprises spim.

18. The computer system of claim 17 further comprising:

a software portion configured to receive a second incoming instant message from the unrecognized source, the second incoming instant message being received as a reply to the sent question;

a software portion configured to examine the second incoming instant message; and a software portion configured to determine whether the incoming instant message comprises spim based on at least results of examining the second incoming instant message.

* * * * *